United States Patent
Diab

(10) Patent No.: US 8,929,835 B2
(45) Date of Patent: Jan. 6, 2015

(54) NON-INTRUSIVE AND OPERATIONAL COMMUNICATION SYSTEM MONITORING AND DIAGNOSTICS

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 479 days.

(21) Appl. No.: 13/166,955

(22) Filed: Jun. 23, 2011

(65) Prior Publication Data

US 2012/0250518 A1    Oct. 4, 2012

Related U.S. Application Data

(60) Provisional application No. 61/471,401, filed on Apr. 4, 2011.

(51) Int. Cl.
*H04B 17/00* (2006.01)
*H04L 12/26* (2006.01)

(52) U.S. Cl.
CPC .................................... *H04L 43/50* (2013.01)
USPC ................... 455/67.14; 455/423; 455/226.1; 370/241

(58) Field of Classification Search
None
See application file for complete search history.

(56) References Cited

U.S. PATENT DOCUMENTS

| | | | |
|---|---|---|---|
| 2004/0017965 A1 * | 1/2004 | Abe | 385/24 |
| 2005/0281392 A1 * | 12/2005 | Weeks et al. | 379/22 |
| 2008/0195777 A1 * | 8/2008 | Dickens et al. | 710/62 |
| 2011/0069620 A1 * | 3/2011 | Gintis et al. | 370/250 |

* cited by examiner

*Primary Examiner* — Jackie Zuniga Abad
(74) *Attorney, Agent, or Firm* — Duane S. Kobayashi

(57) ABSTRACT

A non-intrusive and operational communication system monitoring and diagnostics. Loopback-type testing is facilitated through testing that is split between transmit and receive sections. Transmit testing on a port can be based on test packets that are removed from the transmission path by a PHY upon detection. Receive testing on a port can be based on live traffic packets.

9 Claims, 6 Drawing Sheets

NON-INTRUSIVE AND OPERATIONAL COMMUNICATION SYSTEM MONITORING AND DIAGNOSTICS

This application claims priority to provisional patent application No. 61/471,401, filed Apr. 4, 2011, which is incorporated by reference herein, in its entirety, for all purposes.

BACKGROUND

1. Field of the Invention

The present invention relates generally to monitoring and diagnostics and, more particularly, to a non-intrusive and operational communication system monitoring and diagnostics.

2. Introduction

Equipment manufacturers have developed various tools for diagnostic and debug purposes. These tools provide important functionality in testing the physical layer connections of interfaces prior to shipment of network equipment (e.g., switch) to a customer for installation.

One of the key diagnostic tools used prior to shipment or in a test environment is loopback testing. In general, loopback testing is based on the routing of transmitted information back to the receiver on the same port from which it was transmitted. The loopback of such transmitted information enables a verification of the connectivity of a circuit as well as the signal quality on the circuit. In effect, the loopback testing enables an isolation of circuit segments, thereby simplifying the diagnostic process.

While diagnostics such as loopback testing have great utility prior to shipment or in a test environment, their effectiveness in a live-field environment is somewhat limited. Network equipment installed in the field have ports coupled to other network equipment. The diagnosis of those ports using loopback testing would therefore require re-configuration of the network equipment, port downtime, traffic loss, and increased administration costs, all of which would impact a customer's network operation. What is needed therefore is a non-intrusive and operational communication system monitoring and diagnostics.

SUMMARY

A non-intrusive and operational communication system monitoring and diagnostics, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
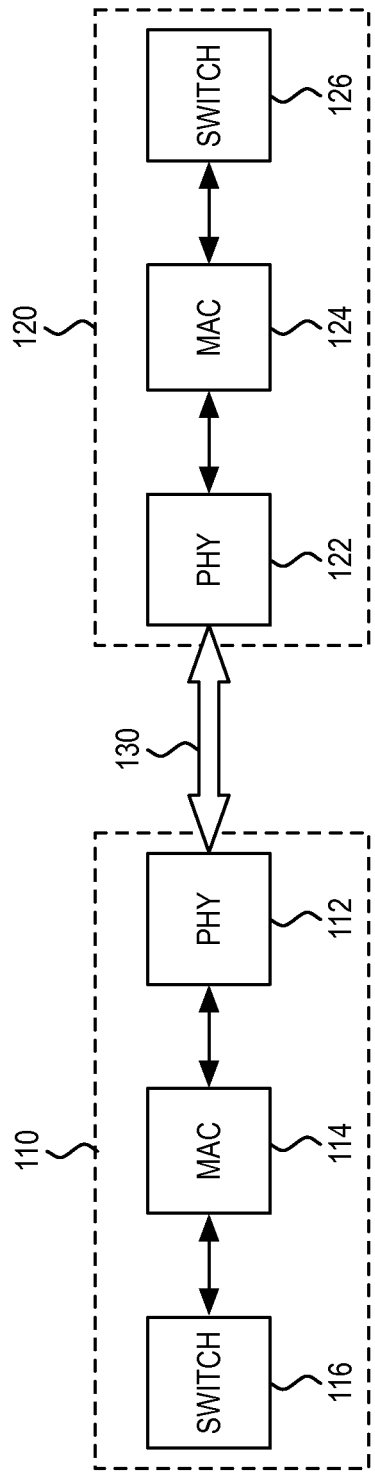
FIG. 1 illustrates an example of network equipment in a live configuration.

FIG. 1 illustrates an example of network equipment in a live configuration. As illustrated, network equipment 110 includes switch 116, which is coupled to media access control (MAC) 114, which is coupled to physical layer device (PHY) 112. For simplicity, PHY 112 illustrates only a single port contained within a multi-port switch. Similarly, network equipment 120 includes switch 126, which is coupled to MAC 124, which is coupled to PHY 122. In the live configuration, PHYs 112 and 122 are connected via physical media 130 (e.g., twisted pair cabling, fiber optic cabling, etc.). As would be appreciated, network equipment 110, 120 can also be embodied as equipment other than a switch, such as, for example, an end station or a router.

Testing and monitoring network equipment in such a live configuration is difficult to accomplish. When network equipment in a live configuration experiences errors on a port, diagnosis of the network equipment typically requires taking the network equipment out of the live configuration. For example, individual ports can be disconnected from other network equipment (e.g., decoupling of PHYs 112 and 122), thereby enabling loopback testing for that port. Alternatively, the network equipment can be removed entirely from the network to enable sufficient diagnostics to be performed. In another scenario, the diagnosis can include loading different software onto the network equipment. In these and other scenarios, the disruption to the network, and hence the end users, is significant. In the end, the outages caused by these disruptions represent large costs that drive up the operational expense of the network significantly.

It is a feature of the present invention that diagnostics and monitoring of a port can be enabled during operation of network equipment in a live configuration, wherein such diagnostics and monitoring do not modify the traffic profile on the port. This ensures that additional traffic burdens are not placed on a port, thereby ensuring that additional energy costs are not incurred. As will be described in greater detail below, the diagnostics and monitoring of the present invention can be performed non-intrusively, which thereby ensures that the diagnostics and monitoring do not impact the passage of live traffic on the network equipment port. More specifically, the diagnostics and monitoring enabled by the present invention can be performed without loss or delay of live traffic on the network equipment port.

In the present invention testing of both the transmit and receive functions on a port are enabled by testing that achieves the same results of loopback testing and perhaps goes even further. For example, loopback testing without the use of an external connector cannot diagnose the complete transmit and receive paths. In the present invention, testing between the transmit and receive paths is decoupled. By this decoupling, the limitations of loopback-type testing in a live configuration are overcome.

In a live configuration, the network equipment has no control over the timing of traffic on a port. In the transmit direction, the network equipment would need to wait for a gap in traffic. Waiting for such a gap is unpredictable, however, and would be dependent on the type of outgoing traffic. While some live traffic would be bursty, thereby containing significant gaps between bursts of traffic, other types of live traffic can be sustained, thereby containing relatively few gaps. The timing of any such gaps in live traffic would be unpredictable.

Similar unpredictable issues would also exist in the receive direction as the network equipment would have no knowledge of when live traffic would appear on a port. For example, if network equipment 110 would like to loopback traffic on a port containing PHY 112, then there exists the potential that the timing of such loopback traffic would coincide with the receipt of traffic from network equipment 120. If such a scenario were to occur, then network equipment 110 would not overwrite the live traffic with a loopback test packet. Instead, network equipment 110 could choose to buffer the live traffic. This buffering option is unappealing, however, because such a delay would add latency to the traffic. Moreover, any effort to try and pause the remote station (e.g., using PAUSE frames) from sending traffic would be very complex, incur latency, and modify the traffic profile.

In general, unnecessary latency is unacceptable for both transmit and receive directions, especially in those instances where ultra-low latency is required (e.g., high-performance computing). An additional problem of buffering is the addition of jitter to the latency, due to the introduction of latency only during those times when loopback testing occurred. Jitter in latency is especially problematic for certain types of traffic (e.g., Ethernet Audio Video Bridging (AVB)) where predictable latency is a key element to guaranteeing latency on a connection.

In the present invention, testing is split between the transmit and receive portions of a port. To illustrate testing in the transmit direction, reference is made to the flowchart of FIG. 2. The testing in the transmit direction can be based on test packets that include a defined or configurable signature at a defined or configurable location within the test packet. For example, the signature could be a mark in the packet such as a predefined pattern at a given offset from the start of the packet. Test packets can be shorter in length, and can be fixed or vary in size for different forms of testing. Also, the data contained within the test packets can be varied to assure data integrity as would be apparent.

Figure 2:
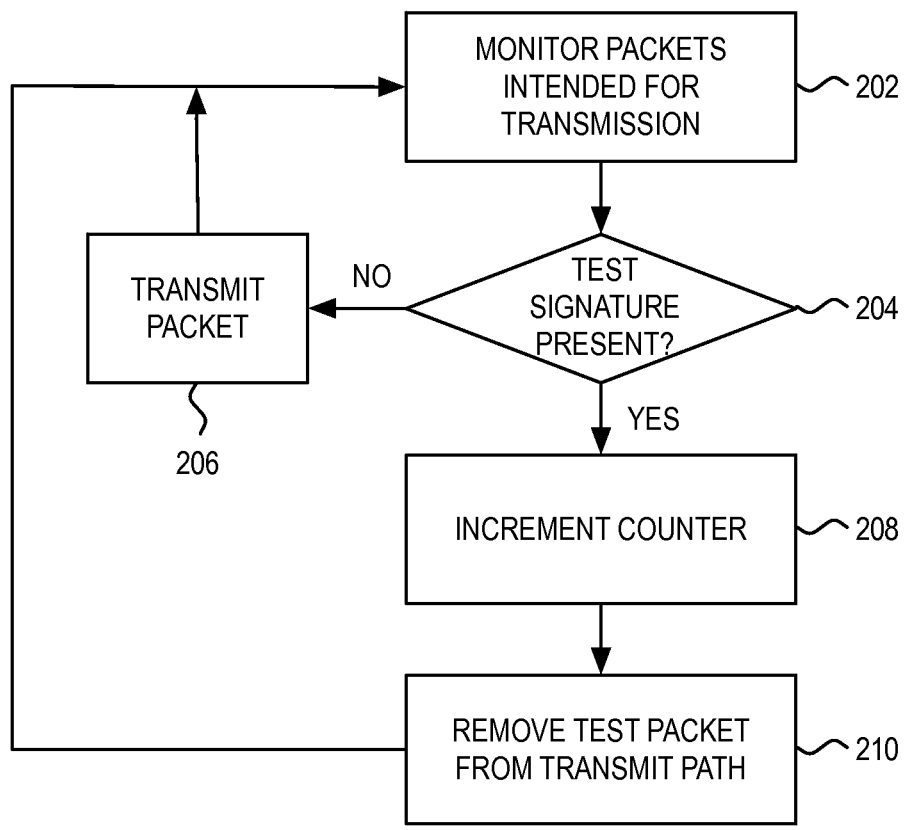
FIG. 2 illustrates a flowchart of a process of testing in a transmit direction.

The process of FIG. 2, begins at step 202 where a PHY would monitor packets that are intended for outgoing transmission. At step 204, the PHY can be configured to identify the start frame delimiter (SFD) in the packet, then determine whether a particular test signature exists at a particular offset from the SFD. As would be appreciated, the particular location and type of test signature that is being searched would be implementation dependent and could be configurable. The significance of the determination of step 204 would be to distinguish between a test packet and a packet for live traffic on the port.

If it is determined at step 204 that the test signature is not present in the monitored packet, then the packet is determined to be live traffic. The live traffic packet is then transmitted on the outgoing port as normal at step 208. Monitoring of further packets intended for transmission would resume at step 202.

If, on the other hand, it is determined at step 204 that the test signature is present in the monitored packet, then the packet is determined to be a test packet. The process would then continue to step 208 where a counter is incremented. In one embodiment, multiple counters are used to monitor the receipt by the PHY of test packets of different types. The counter that is incremented would therefore be associated with the detection of a particular type of test packet. After the counter is incremented at step 208, the process continues at step 210 where the test packet would be removed from the transmit path. In one embodiment, the PHY can also be designed to count the cyclic redundancy check (CRC) on the transmit path.

Figure 3:
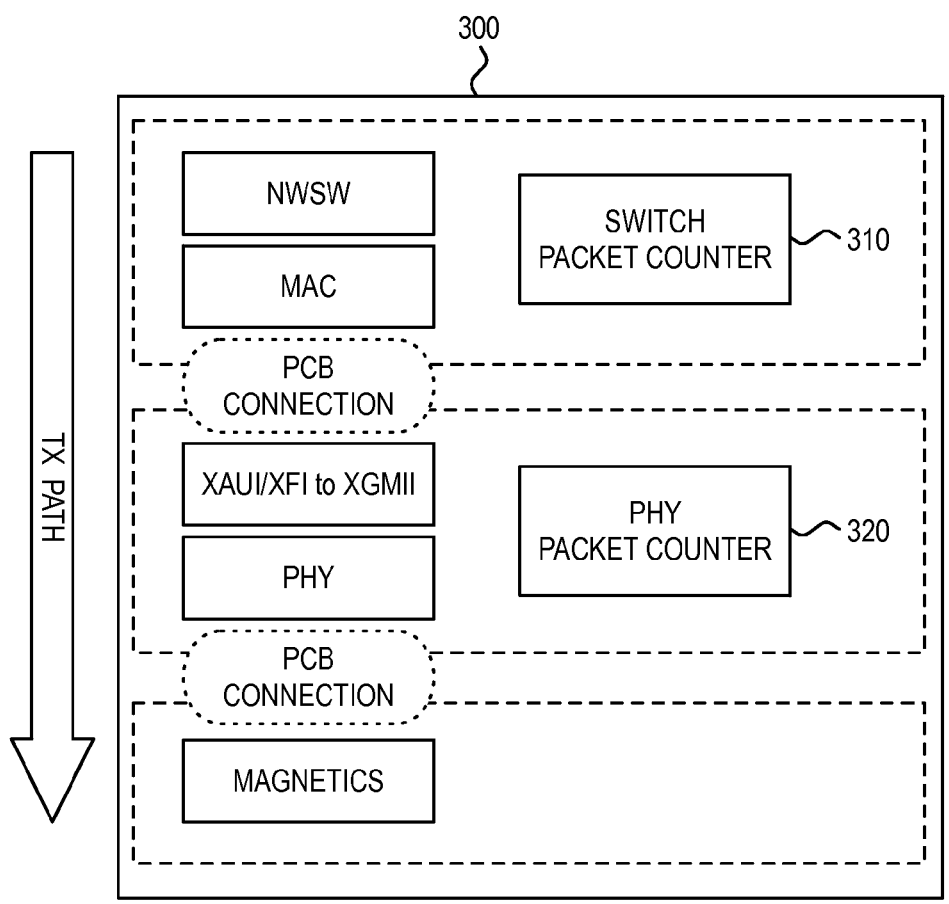
FIG. 3 illustrates an example of a transmit path in an example switch.

The monitoring and diagnostics of the transmit path are based on a check of the counters by the diagnostic software to ensure that the value of the PHY-incremented counters match the number of test packets that have been counted above the MAC. FIG. 3 illustrates an example of a transmit path in a switch 300. As illustrated, switch 300 includes switch packet counter 310 and PHY packet counter 320 that can be used for the monitoring and diagnostics. In one embodiment, PHY packet counter 320 can be reset using a specially-marked test packet that is discarded prior to transmission.

Figure 4:
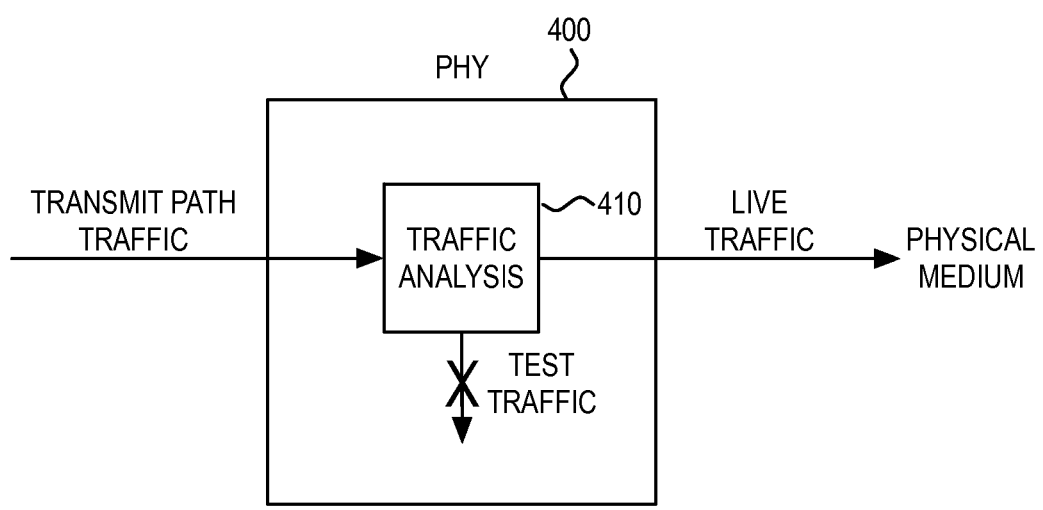
FIG. 4 illustrates a high-level overview of a physical layer device that analyzes traffic on the transmit path.

FIG. 4 illustrates a high-level overview of a PHY that can examine traffic for the test signature. As illustrated, PHY 400 includes traffic analysis module 410. Traffic analysis module 410 receives the transmit path traffic, which can include both live traffic and test traffic. Transmit path traffic that does not contain the test signature is identified as live traffic and is transmitted onto the physical medium. In contrast, transmit path traffic that does contain the test signature is identified as test traffic and is therefore removed from the transmit path. As would be appreciated, the specific instantiation of traffic analysis module 410 within PHY 400 would be implementation dependent, without departing from its intended purpose of facilitating an analysis of the transmit path without actual transmission of the test traffic.

Here, it is recognized that the actual transmission of the test packet is not required as the loopback-type testing has split the transmit and receive portions of the testing. The detection of the test packet at the PHY is therefore sufficient for monitoring and diagnostics purposes.

It should also be noted that the inclusion of test packets in the gaps of live traffic is not dependent on particular timings. While the test packets can be generated periodically, their effectiveness is not dependent on such periodicity. Rather, the monitoring and diagnostics are dependent on a check of the counters above the MAC (e.g., by diagnostic software) to ensure that the value of the PHY-incremented counters match the number of test packets that have been generated and output onto the transmit path.

Figure 5:
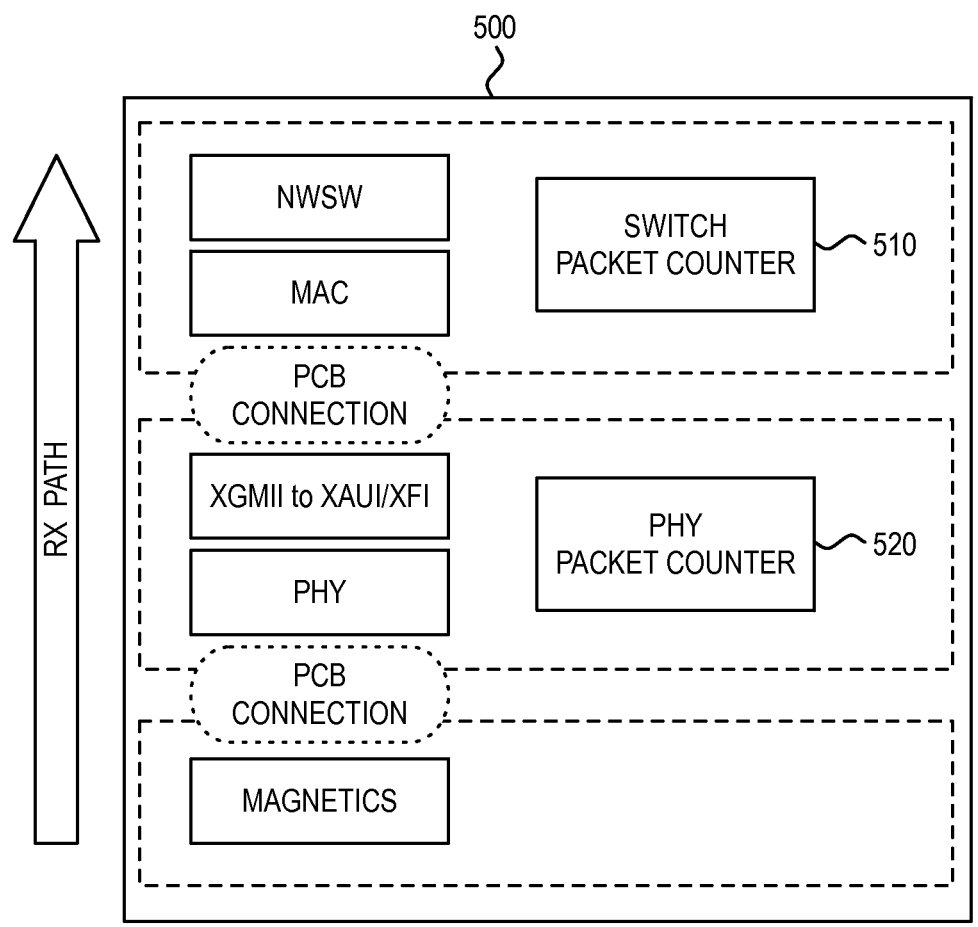
FIG. 5 illustrates an example of a receive path in an example switch.
Figure 6:
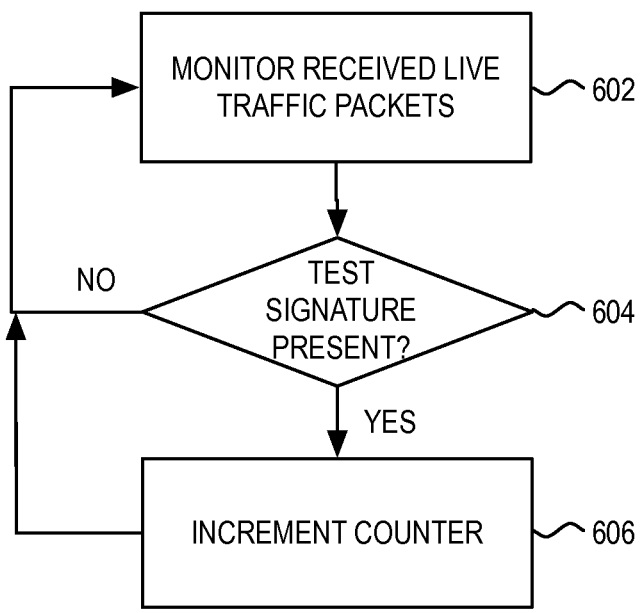
FIG. 6 illustrates a flowchart of a process of testing in a receive direction.

The testing of the receive path operates in a similar fashion to the check of the transmit path. FIG. 5 illustrates an example of a receive path in an example switch 500 that includes switch packet counter 510 and PHY packet counter 520. Unlike conventional loopback testing, the testing of the receive path on a port is not dependent on test traffic that is generated by the transmitter on that same port. Rather, the testing of the receive path on a port can be based on traffic that is normally received on a port when the network equipment is actively operating in a live configuration. To illustrate testing in the receive direction, reference is now made to the flowchart of FIG. 6.

As illustrated the process begins at step 602 where live-traffic packets are monitored. In various examples, these live-traffic packets can be network wide test packets that are not generated within a particular network equipment, protocol packets, live data packets of certain properties (signature, size, protocol features such as a time stamp, etc.), or the like.

As noted above, the principles of the present invention are not dependent on a particular type of live-traffic packet that is monitored.

At step 604, it is then determined whether the live traffic packet includes a defined test signature. Unlike the testing in the transmit direction, testing in the receive direction is not based on specially-designed test packets for the monitoring process. Rather, testing in the receive direction is based on live-traffic packets that are normally received when the network equipment is actively operating in a live configuration. Here, the search for a signature is based on a defined field for a particular type of known packet that is sent periodically.

In one example, the testing of the receive direction can be based on the time-to-live (TTL) field in Link Layer Discovery Protocol (LLDP) packets that are sent periodically. In another example, the testing of the receive direction can be based on time stamps in Ethernet AVB packets.

Regardless of the particular type of known traffic packet that is used as a test packet in a monitoring process, the identification of the particular signature can be used to increment a counter.

Returning to the flowchart of FIG. 4, if it is determined at step 604 that the test signature is not present in the received live traffic packet, then no additional action is required and monitoring would continue at step 602. If, on the other hand, it is determined at step 604 that the test signature is present in the live traffic packet, then the live traffic packet is determined to be a test packet. The process would then continue to step 606 where a counter is incremented by the PHY. In one embodiment, multiple counters are used to monitor the receipt by the PHY of live traffic packets that contain different values in the defined fields. The counter that is incremented by the PHY would therefore be associated with the detection of a particular value in the defined field. After the counter is incremented at step 606, the process continues back to step 602 where further monitoring of live traffic packets would occur. As with the transmit path, the PHY can also be designed to count the cyclic redundancy check (CRC) in the receive path.

Like the transmit direction, the monitoring and diagnostics are dependent on a check of the counters by the diagnostic software to ensure that the value of the PHY-incremented counters match the number of particular live traffic packets that have been counted above the MAC.

In one embodiment, the PHY packet counter can be reset by a specially-marked packet. In one example, the specially-marked packet can be a defined test packet. Here, the limited use of a test packet would not adversely impact system performance, and can be potentially accommodated by limited buffering in the PHY. In another example, the specially-marked packet can be based on a property of live traffic that is received. In yet another example, the specially-marked packet can be a packet in the transmit path.

In the present invention, it is recognized that the generation of actual test packets is not required as the loopback-type testing leverages live traffic packets received from far-end equipment rather than loopback packets generated by the transmitter on the same network port on which it is received. As such, the leveraging of live traffic packets does not suffer from test packets that can be received at the same time as live traffic packets. Latency and jitter in latency issues are thereby averted.

In one embodiment, the usage of live traffic packets can also be used in the transmit direction in a similar manner to the usage of live traffic packets in the receive direction. In this embodiment, the live traffic packets in the transmit direction would replace the test packets described above. Generation of specially designed test packets would therefore by unnecessary. As would be appreciated, if a live traffic packet is used in the transmit direction, the live traffic packet would not be discarded.

In the present invention, the monitoring and diagnostics of the transmit and receive paths can be triggered by management software using in-band management packets/frames that are intended for the PHY and stripped out and/or symbol-coded signaling in the inter-packet gap. Other forms of signaling can include physical layer signaling, registers, and/or out-of-band signaling.

In one embodiment, the principles of the present invention such as that described above can be used to generate health registers for the PHY transmit and receive paths, as well as the management functions of the PHY. These health registers can be used to reflect self testing that is done on the transmit and receive paths as well as the management portions of the PHY. The self testing can be performed at startup, done periodically, and/or done upon a management request. The health registers can also be refined to reflect particularly defined subsections of each path, and can also include health parameters of the link itself. In various embodiments, the health registers can be accessed via in-band, out-of-band, or the like mechanisms.

As has been described, the principles of the present invention provide a flexible framework that can be applied to various PHY types. For example, the principles of the present invention can be applied to MACSec, non-MACSec implementations, AVB, Energy Efficient Ethernet (EEE), or the like as would be apparent. Also, the principles of the present invention are not dependent on particular PHY speeds.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A diagnostic method of network equipment that operates in a live configuration in a network, comprising:
   determining, by a physical layer device in said network equipment, whether a packet intended for transmission includes a test signature, wherein said comprises determining by said physical layer device that is connected to a media access control device, said physical layer device connected to a physical communication medium via magnetics;
   if it is determined by said physical layer device that said packet does not include said test signature, then transmitting, by said physical layer device, said packet to a peer device via said physical communication medium; and
   if it is determined by said physical layer device that said packet does include said test signature, then removing, by said physical layer device, said packet from a transmission path to said peer device, and incrementing, by said physical layer device, a first counter; and
   comparing, by diagnostic software, a value of said first counter to a value of a second counter that is incremented by a test module residing in a layer above a media access control layer.

2. The method of claim 1, wherein said transmitting comprises transmitting a live traffic packet over twisted pair cabling.

3. The method of claim 1, wherein said determining comprises determining whether a test signature exists at a particular offset from a start frame delimiter in a packet.

4. A diagnostic method in a physical layer device that operates in a live configuration in a network, comprising:
- determining by said physical layer device, whether a packet intended for transmission includes a test signature, wherein said physical layer device is connected to a media access control device, said physical layer device also connected to a physical communication medium via magnetics;
- if it is determined by said physical layer device that said packet does not include said test signature, then transmitting by said physical layer device said packet to a peer device via said physical communication medium; and
- if it is determined by said physical layer device that said packet does include said test signature, then removing by said physical layer device said packet from a transmission path to said peer device, and incrementing a first counter, wherein a comparison of a value of said first counter to a value of a second counter that is incremented by a test module residing in a layer above a media access control layer enables a diagnostic of a transmission path.

5. The method of claim 4, wherein said transmitting comprises transmitting a live traffic packet over twisted pair cabling.

6. The method of claim 4, wherein said determining comprises determining whether a test signature exists at a particular offset from a start frame delimiter in a packet.

7. A diagnostic method in a physical layer device that operates in a live configuration in a network, comprising:
- receiving, by said physical layer device, a packet from a peer device via a physical communication medium, wherein said physical layer device is connected to a media access control device, said physical layer device also connected to said physical communication medium via magnetics;
- determining, by said physical layer device, whether said received packet includes a defined signature; and
- if it is determined by said physical layer device that said packet does include said defined signature, then incrementing by said physical layer device a first counter, wherein a comparison of a value of said first counter to a value of a second counter that is incremented by a test module residing in a layer above a media access control layer enables a diagnostic of a receive path.

8. The method of claim 7, wherein said receiving comprises receiving a packet over twisted pair cabling.

9. The method of claim 7, wherein said determining comprises determining whether a defined signature exists at a particular offset from a start frame delimiter in a packet.

* * * * *

UNITED STATES PATENT AND TRADEMARK OFFICE
CERTIFICATE OF CORRECTION

PATENT NO. : 8,929,835 B2
APPLICATION NO. : 13/166955
DATED : January 6, 2015
INVENTOR(S) : Wael William Diab Page 1 of 1

It is certified that error appears in the above-identified patent and that said Letters Patent is hereby corrected as shown below:

In the Claims

Col. 6, line 49, Claim 1, after "said" insert --determining--.

Signed and Sealed this
Seventh Day of April, 2015

Michelle K. Lee
*Director of the United States Patent and Trademark Office*